J. L. KELLOGG.
OPEN SHRED CEREAL BISCUIT.
APPLICATION FILED APR. 2, 1915.

1,168,888.

Patented Jan. 18, 1916.

WITNESSES

INVENTOR
John Leonard Kellogg

ATTORNEY

UNITED STATES PATENT OFFICE.

JOHN LEONARD KELLOGG, OF BATTLE CREEK, MICHIGAN.

OPEN-SHRED CEREAL BISCUIT.

1,168,888. Specification of Letters Patent. Patented Jan. 18, 1916.

Application filed April 2, 1915. Serial No. 18,697.

*To all whom it may concern:*

Be it known that I, JOHN LEONARD KELLOGG, a citizen of the United States, residing in Battle Creek, county of Calhoun, and State of Michigan, have invented a new and useful Improvement in Open-Shred Cereal Biscuits, of which the following is a specification.

My invention relates and is especially applicable to openshred biscuits made of shredded wheat, corn and other cereals.

These openshred cereal biscuits have heretofore usually been made convex on both sides, and are often served whole, not only with milk or cream, but with berries, fruits and other food accessories, which are deposited on top of the biscuit.

To hold the berries, fruits, etc. on the convex top of the biscuit, it has been customary to smash or break in the top of the fragile biscuit with a spoon and deposit the berries, fruits etc. in the rough break thus formed.

My invention consists primarily, in pressing, molding or forming the openshred biscuit originally with an arched, concave, sunken or hollow top, to contain the berries, fruits or other accessories, and cause the milk or cream poured thereon to penetrate the pores of the biscuit more quickly and thoroughly than when it is poured on a convex top, and quickly runs off into the dish around the biscuit.

My invention also consists in making the bottom of the openshred biscuit convex to correspond with the concavity of the top, so that the biscuits will nest into each other, and thus can be more conveniently packed in a carton, while a larger amount of food can be placed in a smaller carton.

In order that the spirit and scope of my invention may be made clear and the invention carried into practice, I shall first describe in detail the method in which I at present carry the invention into practice and then define the invention in the claims.

Reference is to be had to the accompanying drawings forming part of this specification, in which like parts are designated by the same numbers in both figures.

Figure 1:
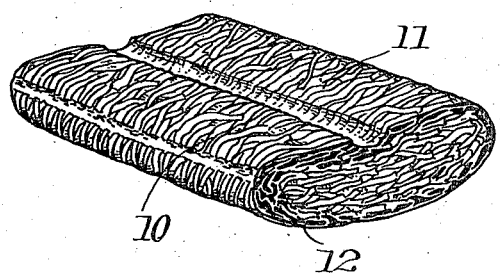
Figure 2:
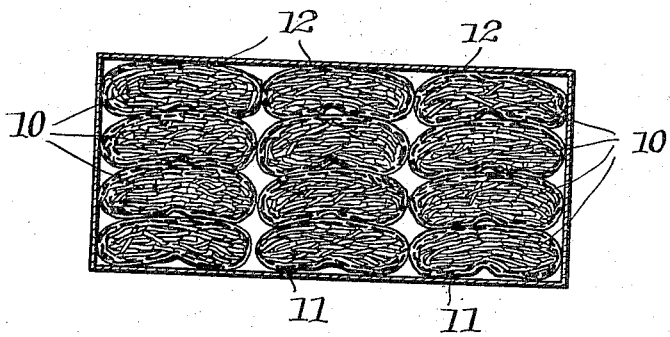

Figure 1 is a perspective view of an openshred biscuit made according to my invention. Fig. 2 shows a number of said biscuits as nested and packed in a carton for shipment.

In making the openshred cereal biscuit 10, shown in the drawings, I may use any approved process and machinery suitable for the purpose, or may use an improved process and improved machinery for the purpose, which will be fully described in applications for patents to be filed by me hereafter and will be then properly referred to in this application.

In the usual process of making and before the final baking, the biscuit is molded, pressed or otherwise formed with a concave, hollow, sunken or inversely arched top 11, preferably in the form, roughly, of a cylindrical segment as shown in Fig. 1.

In serving, the sunken or concave side 11, herein called the top, is placed uppermost and the berries, fruits or other accessories, and preferably also the milk or cream, with which it is desired to serve the biscuit, are placed in the hollow, sunken or concave top 11, with the new and distinctly advantageous result that the berries or accessories will be held and contained in position on the top of the biscuit without the necessity of smashing in the top of the biscuit as heretofore.

The milk or cream, if poured on the top of the biscuit, will also be contained until it permeates the biscuit, instead of running off the top, as in the case of the ordinary flat or convex topped biscuit.

In addition to making the top of the biscuit inversely arched, concave, sunken or hollow as described, I also prefer to make the bottom 12 of the biscuit, correspondingly concave or arched, so that in packing the biscuits in cartons or boxes as illustrated in Fig. 2, usually with the convex bottoms up, the biscuits will nest into each other. The biscuits can thus be much more expeditiously and securely packed, and a larger amount of food can be contained in a smaller carton.

I claim as my invention:

1. A cereal biscuit made with a concave top of the general character of a longitudinal cylindrical segment.

2. A cereal biscuit made with a top and bottom both of the general character of a longitudinal cylindrical segment one being convex and the other concave.

JOHN LEONARD KELLOGG.

In presence of—
F. A. CLARK,
C. H. HUGHES.